Oct. 9, 1934.  J. W. McGEE  1,976,242
DRYING AND WASHING REEL
Filed Aug. 4, 1933
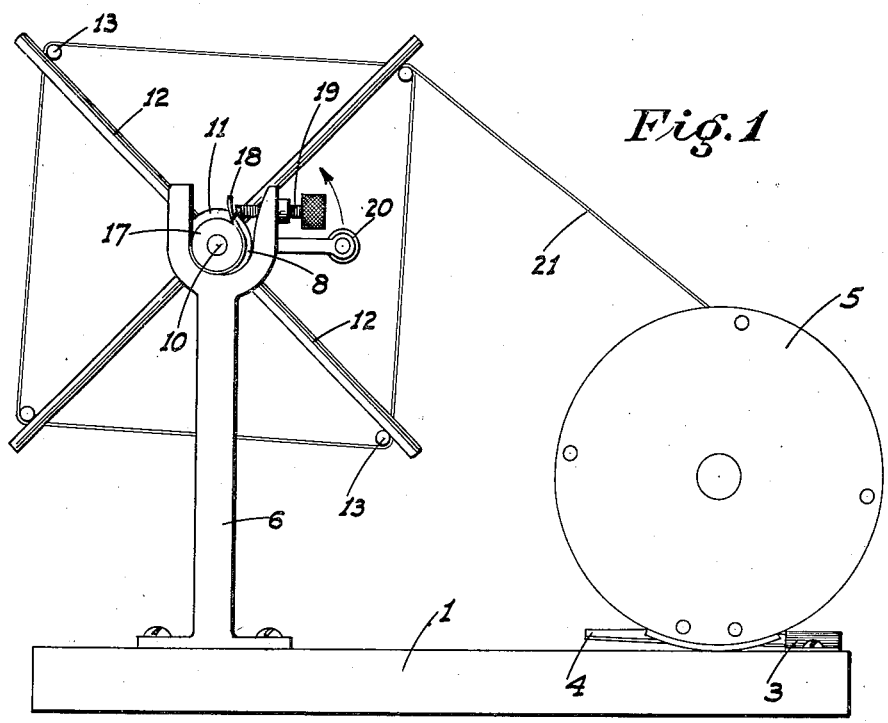
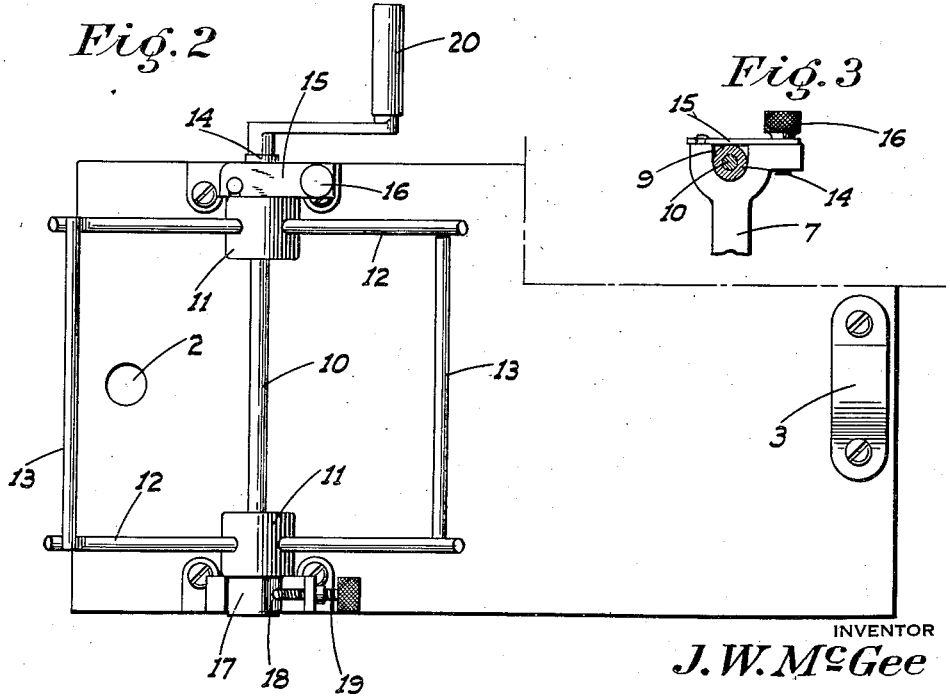
INVENTOR
J. W. McGee Patented Oct. 9, 1934

1,976,242

UNITED STATES PATENT OFFICE 1,976,242

DRYING AND WASHING REEL

James W. McGee, Tracy, Calif.

Application August 4, 1933, Serial No. 683,616

2 Claims. (Cl. 242—104)

This invention relates to a device for drying fish lines from the reels of fishing poles, my main object being to provide a simple portable device for the purpose having means for supporting the reel when detached from the pole, and having a drying reel arranged so that the line from the pole reel may be quickly and easily transferred to said drying reel.

Another object is to detachably mount the drying reel in place, so that when a line has been reeled thereon, it may be easily washed. Also, another empty reel may be installed to receive the line from another pole reel, so that the one device, with a number of reels usable therein, may be used to dry a number of lines simultaneously. The device is also arranged so that the line may be again transferred to the pole reel after it is dried, and a further object of my invention is to provide an adjustable braking means for the drying reel so that there is no danger of said reel overrunning the speed of winding onto the pole reel and thus possibly causing the line to be tangled.

A further object of the invention is to produce a simple and inexpensive device and yet one which will be exceedingly effective for the purpose for which it is designed.

These objects I accomplish by means of such structure and relative arrangement of parts as will fully appear by a perusal of the following specifications and claims.

In the drawing similar characters of reference indicate corresponding parts in the several views:

Fig. 1 is a side elevation of the device as in operation.

Fig. 2 is a top plan view, with the fish-pole reel removed.

Fig. 3 is a fragmentary view showing the mounting for one end of the drying-reel spindle.

Referring now more particularly to the characters of reference on the drawing, the device comprises a portable base 1 provided toward one end with a hole 2 so that the device may be hung from a wall if desired. Mounted centrally of the width of the base adjacent one end is a socket 3 to removably receive one end of the saddle 4 of a standard fish pole reel 5.

Upstanding from the base toward the end opposite the socket are transversely spaced posts 6 and 7, symmetrically disposed relative to the socket, said posts having U-shaped bearing cradles 8 and 9 respectively on their upper ends.

The drying reel, which is removably supported in the cradles, comprises an axial spindle 10 on which spaced hubs 11 are fixed. Radial arms 12 project from the hubs, which arms are connected inwardly of their outer ends by cross bars 13.

One of the hubs is provided with a reduced portion 14 which turnably fits in the cradle 9 so as to be flush with the top surface thereof. It is then removably held in place by what may be termed a swinging latch plate 15, which extends over the top of the cradle and is pivoted in connection with the adjacent post on a clamping hand-screw 16.

The other hub 11 is provided with a reduced portion 17 forming a brake drum which fits loosely in the cradle 8 and is engaged by a spring brake band 18. This band is anchored at one end in the cradle and extends around the bottom of the same, and is engaged toward its other end, above the drum 17, by an adjustable hand screw 19. The band and screw are arranged so that the band may be tightened about the drum with any desired pressure, and yet may be slacked away sufficiently to allow the drum to be removed vertically from the cradle.

The hubs fit between the bearing cradles with sufficient freedom to permit of ready rotation of the reel, but so as to prevent lateral play of the same. The spindle on one end is provided with a crank handle 20 so that it may be conveniently turned.

In operation, the reel 5 is mounted in place on the base, and the end of the line 21 from said reel is fastened to one of the cross bars 13. The drying reel is then rotated to transfer the line from the pole reel to the drying reel. When the winding is completed the device may be left standing, or hung up until the line is dry, or the drying reel with the line thereon may be removed to allow another drying reel to be mounted on the device, or for washing the line on the reel.

When it is desired to rewind the dried line onto the reel 5, the latter is of course rotated by hand, and the brake band is tightened up sufficiently to prevent such undue freedom of rotation of the drying reel as would tend to cause it to overrun the reel 5 and possibly get the line tangled. When the line is finally all rewound, the tied end is disengaged from the drying reel bar, and the reel 5 is withdrawn from the socket 3 for replacement on the pole.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a line drying device, a drying reel having axial end elements, fixed members having bearing cradles the outer ends of which are spaced apart a distance not less than the diameter of the end elements and one of which directly engages one of the reel elements, a spring band extending in and about the other cradle and supporting the corresponding reel element, one end of the band being secured to the cradle and the other end being free and projecting beyond the element, and a retractible adjusting screw applied against the outer face of the band at its free end.

2. In a line drying device, a drying reel having axial end elements, fixed members having bearing cradles the outer ends of which are spaced apart a distance not less than the diameter of the end elements and one of which directly engages one of the reel elements, a spring band extending in and about the other cradle and supporting the corresponding reel element, and arranged so that while the spacing between the free end of the band and the opposite side of the cradle is normally less than the diameter of the element engaged by the band the latter may expand so that said spacing equals the diameter of the element, and means applied to the free end of the band on its outer face to adjustably tighten the same about the element.

JAMES W. McGEE.